US006800797B2

(12) United States Patent
Steiger, III

(10) Patent No.: US 6,800,797 B2
(45) Date of Patent: Oct. 5, 2004

(54) METHOD AND APPARATUS FOR PRODUCING ACOUSTICAL GUITAR SOUNDS USING AN ELECTRIC GUITAR

(76) Inventor: Henry Martin Steiger, III, 4060 E. Greenway, No. 4, Phoenix, AZ (US) 35032

( * ) Notice: Subject to any disclaimer, the term of this patent is extended or adjusted under 35 U.S.C. 154(b) by 0 days.

(21) Appl. No.: 10/078,025

(22) Filed: Feb. 15, 2002

(65) Prior Publication Data

US 2003/0154842 A1 Aug. 21, 2003

(51) Int. Cl.7 .................................................. G01D 1/08
(52) U.S. Cl. ............................ 84/267; 84/291; 84/294; 84/270
(58) Field of Search .......................... 84/267, 291, 294, 84/270

(56) References Cited

U.S. PATENT DOCUMENTS

| | | | | |
|---|---|---|---|---|
| 5,056,400 A | * 10/1991 | Wachi et al. | ................. | 84/600 |
| 5,854,435 A | * 12/1998 | Kim | ............................ | 84/291 |
| 6,441,293 B1 | * 8/2002 | LaBarbera | .................. | 84/723 |

* cited by examiner

*Primary Examiner*—Shih-Yung Hsieh
(74) *Attorney, Agent, or Firm*—Tod R. Nissle, P.C.

(57) ABSTRACT

An electric guitar includes a hollow acoustic body, a plurality of strings, a fingerboard, air in the hollow acoustic body, and at least one speaker mounted in the hollow acoustic body. A sound system operatively associated with the strings and speaker causes sound to emanate from the speaker when the strings are played and causes sound to vibrate and resonate the hollow body and air in the hollow acoustic body.

2 Claims, 5 Drawing Sheets

METHOD AND APPARATUS FOR PRODUCING ACOUSTICAL GUITAR SOUNDS USING AN ELECTRIC GUITAR

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC.

Not Applicable.

BACKGROUND OF THE INVENTION.

(1) Field of the Invention

This invention pertains to guitars.

More particularly, this invention pertains to a method and apparatus for producing acoustical guitar sounds by using an electric guitar.

(2) Description of Related Art Including Information Disclosed Under 37 CFR 1.97 and 1.98

The first references to stringed instruments appears in Persian and Chinese writing from the 800's. Developments over the next 800 years lead to a variety of stringed instruments including the violin. The violin includes a hollow body or "box", a fingerboard or neck attached to the body, and a plurality of strings extending over the body and fingerboard. A bow is utilized to produce vibrations in the strings. The body resonates and amplifies sound produced by the vibrating strings. The body of a violin is constructed utilizing wood, glue, and varnish or oil. The methods used to construct a violin determine the tone and amplification achieved when the violin is played. The violins made in the 1600's by Antonio Stradivari are some of the finest made, and other violin makers have for many years attempted to discover and duplicate the techniques utilized by Stradivari. Because of the craftsmanship involved in making a violin, and because of variations in the wood and other materials utilized to make the violin, each individual violin often has its own "fingerprint" in terms of the sounds it produces. Musicians can often, for example, distinguish the sound made by one Stradivarius violin from the sound produced by another Stradivarius violin. The sound made by each string, in concert with the various harmonics produced by the strings and the resonant reaction of the violin body to such sounds, collectively contribute to the sound produced by a violin.

The acoustic guitar is another popular stringed instrument. Like a violin, a guitar has a hollow body, a fingerboard, and strings which extend across the body and fingerboard. Like a violin, the body of the guitar functions to resonate when the strings are played and to amplify sound produced by the vibrating strings. The vibration of a guitar string resonates in the top and bottom plates of the guitar, as well as in the air inside the guitar. Characteristics of the guitar body determine the tone produced by the guitar. For example, the materials used to construct the body, the thickness of the materials, how the face plate and backplate of the body are shaped and are connected to the bouts, etc. contribute to the tone produced when the guitar body resonates and amplifies sound produced by the strings.

An electric guitar includes a body, a fingerboard, strings, and transducers mounted on the body adjacent the strings. The electric guitar is connected to an external amplifier and a speaker by an electric cord. Controls on the guitar regulate the sound produced by the guitar. Controls on the external amplifier also further regulate and modify the sound produced by the guitar. When an electric guitar is played, the vibration of each string is sensed by the transducer. Signals generated by the transducer are electronically processed and produce amplified sound that emanates from a speaker that is connected to the electric guitar. An advantage of the electric guitar is the ability to greatly amplify sound. Another advantage is the ability to electronically manipulate the sound. A disadvantage of an electric guitar with respect to an acoustic guitar is that the electric guitar does not utilize a resonating hollow body to produce and amplify sound. The hollow body and tonal qualities of the acoustic guitar are sacrificed for the ability to electronically amplify and electronically manipulate sound. These tonal qualities are often important to the musician and to the listener, which is one reason symphony orchestras do not use electric violins.

Other electronic instruments exist which synthetically produce the notes produced when a guitar is played. For example, electronic keyboards exist which, when a key on the keyboard is depressed, will produce the sound of a guitar, trumpet, or other instrument. One way electronic synthetic instruments produce notes is by using a mathematical analog algorithm to produce the note. Another way electronic synthetic instruments produce notes is by using the first two to three seconds of a digital file. The digital file comprises a digital recording made when the note is played on a selected instrument—for example, a guitar. The first two to three seconds of the digital file includes the "attack" portion of the note and a part of the "decay" portion of the note. The last part of the decay portion is repeated over and over to simulate artificially the remainder of the decay portion of the note. Accordingly, instruments which synthetically produce the sound of a guitar rely on electronic digital processing and do not require the resonating body, the strings, or any other part of a guitar. Synthetic instruments eliminate the need for and the tonal qualities associated with an acoustic guitar, as well as eliminating the need for musicians to learn to play a guitar. Synthetic instruments similarly eliminate the need for an electric guitar because vibrating strings are not utilized by synthetic instruments to produce sound in synthetic instruments.

While electric guitars are in wide use and are championed by many individuals, one disadvantage of an electric guitar is that the sound it produces is not as rich and does not have the tonal qualities of notes produced by an acoustic guitar. Another disadvantage of a conventional electric guitar is that it does not satisfactorily simulate the playing characteristics of an acoustic guitar because when a user puts his hand across all of the strings of an electric guitar to mute the guitar, a spike of sound is produced followed by no sound because vibration of the strings is stopped. In contrast, when a user places his hand across all of the strings of an acoustic guitar to mute the guitar, vibration of the strings is halted and the acoustic guitar immediately stops producing sound.

Accordingly, it would be highly desirable to produce an electric guitar which more nearly replicated the playing qualities of an acoustic guitar and which produced tonal qualities comparable to that of an acoustic guitar.

It would also be highly desirable to produce an electric guitar which an individual could learn to play during a time span that was less than the time span ordinarily required to learn to play an acoustic guitar or an electric guitar.

Therefore, it is a principal object of the instant invention to provide an improved electric guitar.

Another object of the invention is to provide a method of producing an electric guitar which electronically senses movement of the guitar strings and produces the resonant acoustic sounds of an acoustic guitar.

A further object of the invention is to provide an improved electric guitar in which the sound produced by vibration of the strings is muted so it generally is not audible to a person listening to the guitar.

Still another object of the invention is to provide an improved electric guitar in which the sounds produced during muting of the strings comprise sounds produced by a resonating hollow body.

Yet a further object of the invention is to provide an improved electric guitar which an individual with limited or no musical experience can quickly learn to play.

BRIEF DESCRIPTION OF THE SEVERAL VIEWS OF THE DRAWING(S)

These and other, further and more specific objects and advantages of the invention will be apparent to those skilled in the art from the following detailed description thereof, taken in conjunction with the drawings, in which.

Briefly, in accordance with my invention, I provide an improved electric guitar. The guitar includes a hollow acoustic body to amplify sound; a plurality of strings mounted on the hollow acoustic body; a fingerboard attached to the hollow acoustic body; air in the hollow acoustic body; at least one sound speaker mounted in the hollow acoustic body; apparatus operatively associated with the strings and the speaker to cause, when the strings are played, sound to emanate from the speaker and to vibrate and resonate the hollow acoustic body and air in the hollow acoustic body and emanate outwardly from the hollow acoustic body.

BRIEF SUMMARY OF THE INVENTION

In another embodiment of my invention, I provide an improved method for producing sound. The sound comprises a plurality of notes of a guitar in the range of 80 Hz to 1318 Hz. The method comprises the steps of providing an acoustic frame including a hollow acoustic body to amplify sound, air in the hollow acoustic body, and a fingerboard attached to the acoustic body; mounting strings on the hollow acoustic body; mounting a speaker inside the hollow acoustic body; mounting on the hollow acoustic body sound production means operatively associated with the strings and the speaker to cause, when the strings are played, sound simultaneously to emanate from the speaker and to vibrate and resonate the hollow acoustic body and the air in the hollow acoustic body and emanate outwardly from the hollow acoustic body; and, playing the strings to cause the sound production means to cause sound simultaneously to emanate from the speaker and to vibrate and resonate the hollow acoustic body and the air in the hollow acoustic body.

DETAILED DESCRIPTION OF THE INVENTION

Figure 1:
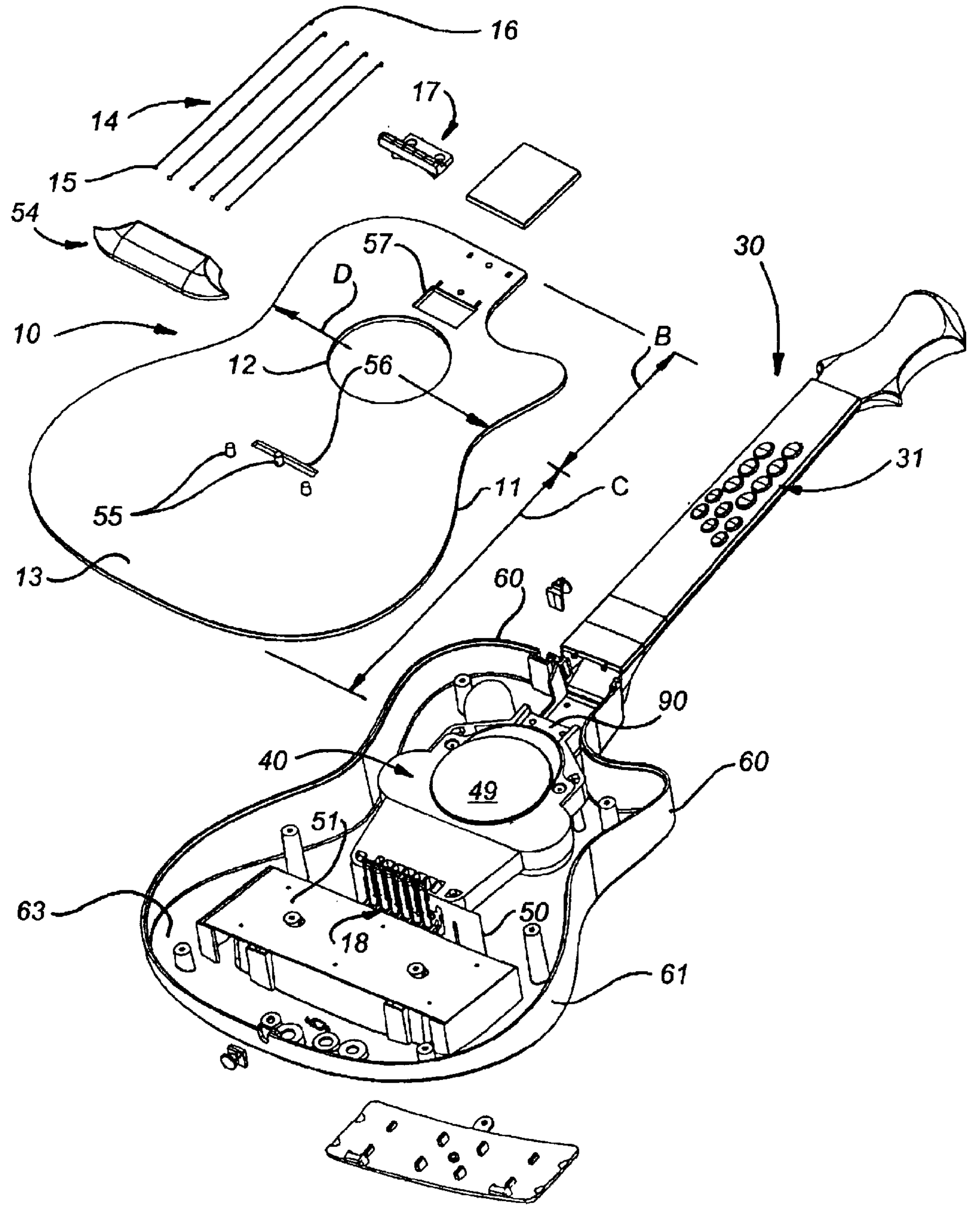
FIG. 1 is an exploded view of a guitar constructed in accordance with the principles of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a guitar including a face plate 10, neck assembly 30, back plate 63—bout 60, 61 assembly, and strummer assembly 40 mounted in the back plate 63—bout 60, 61 assembly. Neck assembly 30 includes fingerboard 31.

Figure 5:
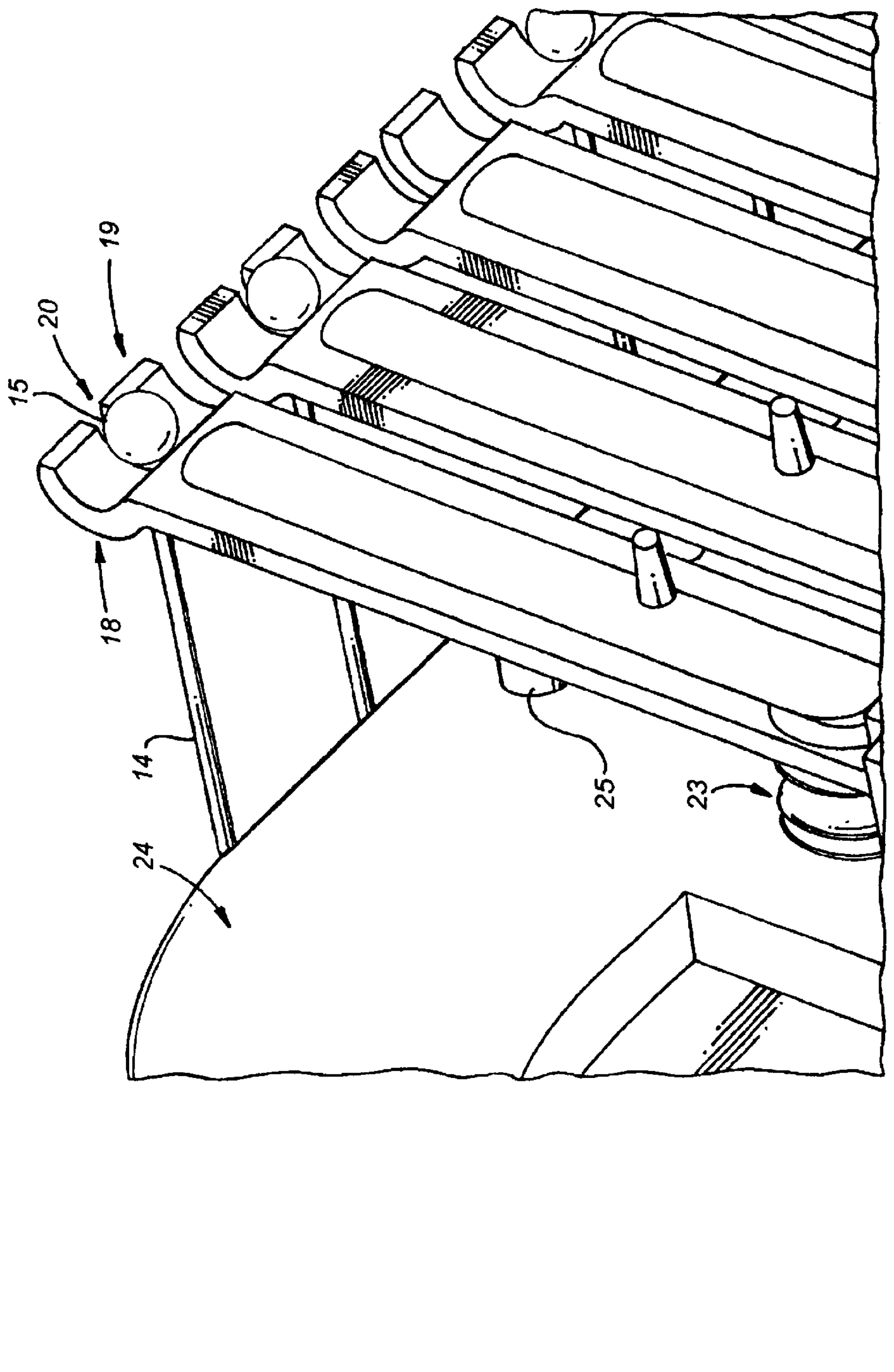

Face plate 10 includes sound hole 12 formed therethrough, slot 56 formed therethrough to receive levers 18 of strummer assembly 40, and rectangular opening 57 formed therethrough. Foot 54 is affixed to plate 10 by pegs 55. String holder 17 extends from surface 90 of strummer assembly 40 outwardly through opening 57. The first end 15 of each string 14 is received by slot 20 formed in the upper end 19 of a lever 18 (FIG. 5). The other end 16 of each string 14 is received by the string holder 17.

The upper third of plate 10 is indicated by arrows B. The lower two thirds of plate 10 is indicated by arrows C. The sound hole 12 extends through plate 10 and ordinarily is positioned in the upper third of plate 10.

Figure 3:
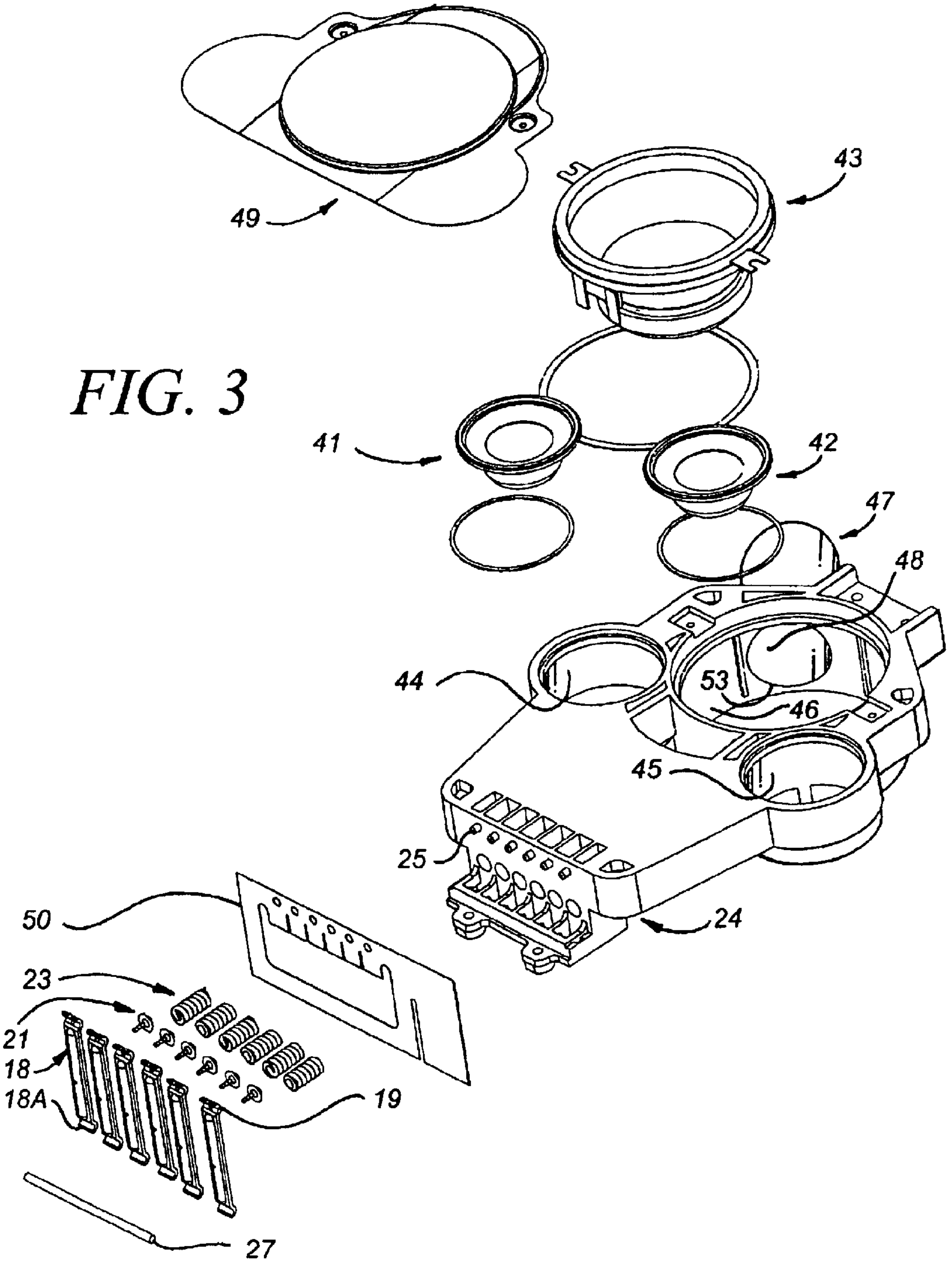
FIG. 3 is an exploded view of the strummer assembly illustrating additional construction details thereof.

The strummer assembly 40 includes cover 49 mounted on housing 24. Cover 49 extends over speakers 41, 42, 43 mounted in cylindrical openings having cylindrical walls 44, 45, 46, respectively (FIG. 3). Generally circular opening 53 is formed in wall 46. Elongate hollow generally cylindrical port 47 is connected to wall 46 such that a portion of the sound from speaker 43 can exit through opening 53 and travel along the interior of port 47 outwardly from opening 53 toward bout 60. Port 47 includes cylindrical inner wall 48. Port 47 is functionally tunable by altering the shape of the port to contour the sound pressure to a desirable range of sound.

Figure 4:
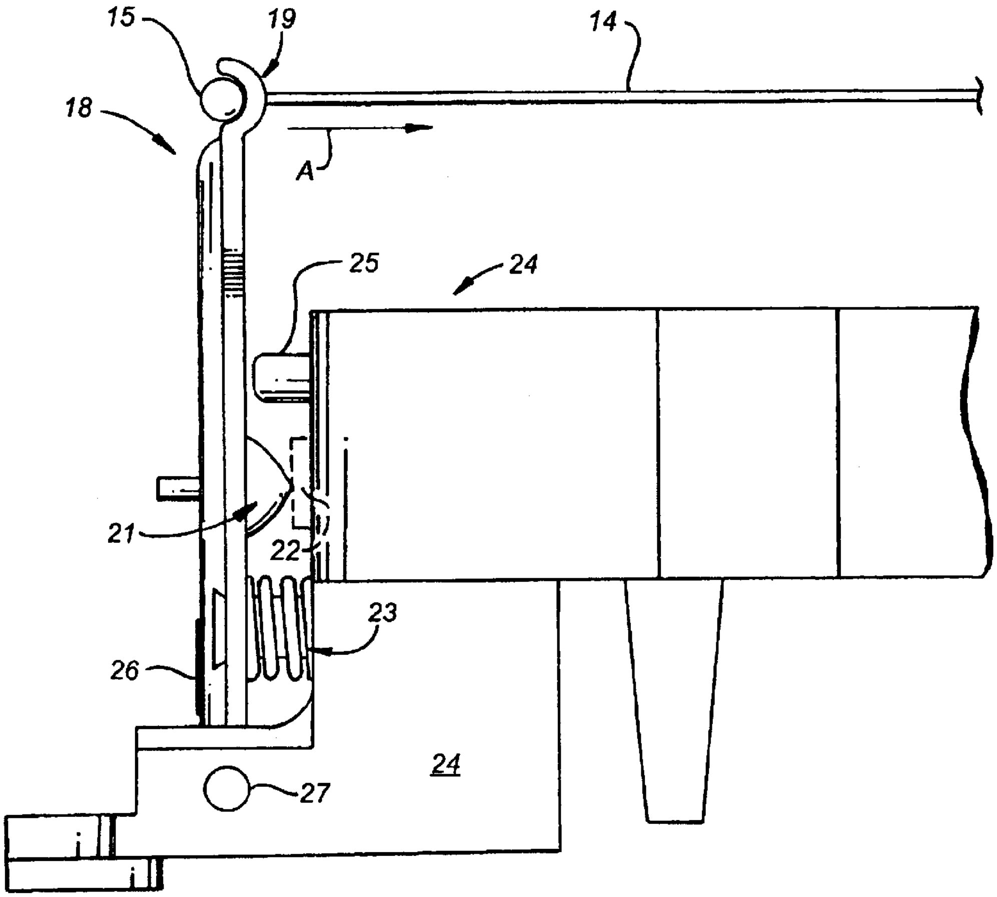
FIG. 4 is a side view of a portion of the strummer assembly illustrating in greater detail the lever arms displaced during strumming of the strings of the electric guitar of the invention; and, FIG. 5 is a front perspective view further illustrating the lever arms in the strummer assembly.

The lower or proximal end or "finger" 18A of each lever 18 pivotally partially circumscribes and engages pin 27. A conically shaped foot 21 is mounted in the intermediate portion of each lever 18. Each lever 18 is operatively associated with a spring 23 that interconnects housing 24 and lever 18. When the string 14 associated with lever 18 is played (i.e., when string 14 is displaced or pulled by the finger or fingers of the user), lever 18 is displaced in the direction of arrow A (FIG. 4) and spring 23 is compressed. After string 14 is released, spring 23 forces lever 18 back to the normal operative position illustrated in FIG. 4. Each lever 18 is also operatively associated with a stop 25 which prevents the upper or distal end of the lever 18 from contacting housing 24 and thereby crushing or otherwise damaging sensor 22 with plunger 21 when lever 18 is displaced in the direction of arrow A. Each foot 21 is operatively associated with a sensor 22. When lever 18 is displaced in the direction of arrow A, foot 21 compresses a sensor 22. Sensor 22, when so compressed, sends a signal to a microprocessor mounted in the guitar. The microprocessor causes sound to emanate from speakers 41, 42, 43. Sensor 22 and the microprocessor are sensitive to the amount of compressive force applied by foot 21. Consequently, the harder foot 21 presses against sensor 22 (i.e., the greater the magnitude of the force applied to sensor 22 by foot 21), the greater the volume or loudness of sound produced by speakers 41, 42, 43. The greater the distance a string 14 is pulled or displaced by the finger(s) of a user, the greater the magnitude of the forces applied against sensor 22 by foot 21.

When depressed, each button 31 in neck assembly 30 transmits a signal to the microprocessor mounted in the guitar of FIG. 1. The signals produced by each button cause the microprocessor to assign a particular sound to one or more strings 14 when that string is played (i.e., pulled or displaced by a user). When a string is played, the foot 21 associated with the string is displaced in the direction of arrow A, the foot 21 contacts and produces a compressive force on sensor 22, sensor 22 sends a signal which is detected by the microprocessor, the microprocessor causes sound to emanate from the speakers 41 to 43, and the sound emanating from the speakers 41 to 43 resonates in the hollow body of the guitar and is amplified. For example, if a selected one of buttons 31 is depressed, the microprocessor can cause speakers 41 to 43 to produce the sound for an "A" note (or "E" note or "ID" note or "C" note, etc.) when a particular string 14 is strummed and the sensor 22 associated with that string produces a signal to the microprocessor.

When the force with which a user displaces or pulls a string 14 increases, the sensor 22 associated with the string 14 produces a signal which indicates that the string 14 is pulled "harder". For example, the magnitude of an electrical signal produced by sensor 22 can increase in proportion to the magnitude of the applied to sensor 22 by foot 21. The microprocessor receives this signal and directs speakers 41 to 43 to produce sound having a greater amplitude and other tonal characteristics associated with louder sounds produced by an acoustic guitar. When the force with which a user displaces or pulls a string 14 decreases, the sensor associated with the string 14 produces a signal which indicates that the string 14 is pulled less. The microprocessor receives this signal and directs speakers 41 to 43 to produce a softer sound and other tonal characteristics associated with softer sounds produced by an acoustic guitar.

The microprocessor can, if desired, cause speakers 41 to 43 to produce notes having a frequency in the range of twenty to twenty thousand Hz. The microprocessor preferably produces notes in the range of forty Hz to about thirteen hundred, eighteen (1318) Hz. When it is desired that the electric guitar of the invention function as a bass guitar, microprocessor can enable speakers 41 to 43 to produce only notes each having a frequency in the range of forty hertz to three hundred, twenty (320) hertz.

The hollow acoustic body of the guitar of the invention—including the face plate 10 and back plate 63 and bout 60 and 61—is critical in the practice of the invention because it functions to resonate and amplify sound. Such a resonating body apparently has not been utilized in an electric guitar and is important in producing a sound which has acoustic tonal qualities and which simulates an acoustic guitar. The peripheral edge 11 of front plate 10 (as well as the peripheral edge of back plate 63) must have a non-linear curvature. An edge has non-linear curvature when different points along the arcuate edge are produced by different radii vectors. In other words, sections or points on edge 11 lie on circles having different radii. A circle has a linear curvature because all points on the circle are produced by a radius (or "radii vector") having the same length. In contrast, different points on edge 11 lie on circles having radii with different lengths. Edge 11 preferably includes points lying on a great many different sized circles each having a radii with a different length. The many different radii enable plate 10 to vibrate naturally at many different resonance frequencies and to assist in the amplification of any frequency note played on the guitar. In order to resonate, plates 10 and 63 and bouts 60 and 61 must be relatively thin, and have a thickness in the range of 0.050 to 0.250 inch. It is also preferred that the distances or widths between opposite sides or edges of plate 10—for example the distance or width indicated by arrows D—vary to facilitate the plates being able to resonate at different sound frequencies. The curvature of the peripheral edges of the plates assures that these distances or widths vary along the plate 10.

Figure 2:
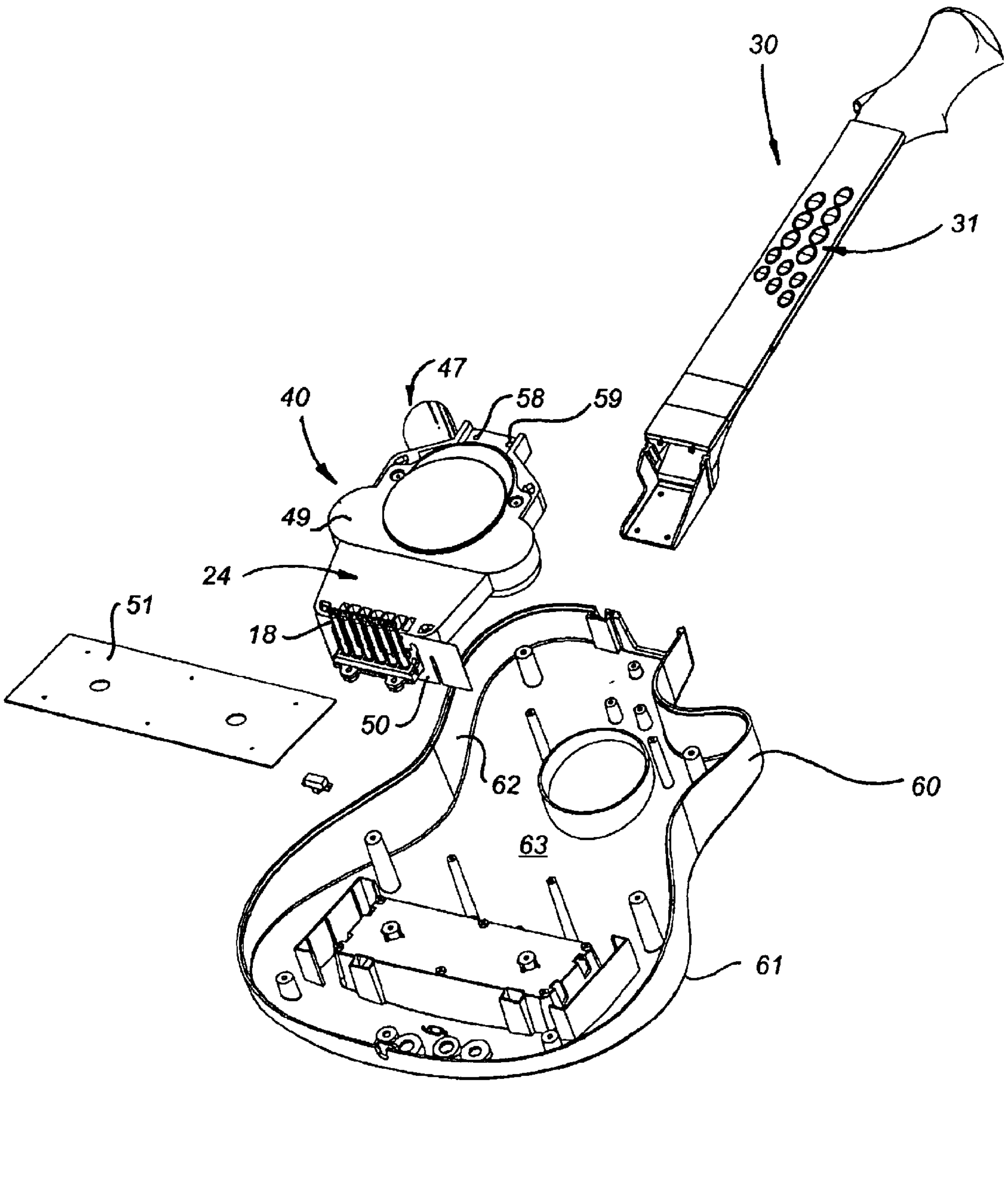
FIG. 2 is an exploded view of the strummer assembly, neck assembly, and back plate—bout assembly of the guitar of FIG. 1 illustrating further construction details thereof.

If the resonating hollow body of the guitar (comprising plates 10 and 63 and bouts 60, 61, but not including the strummer assembly 40 and other electronic components mounted in or on the hollow body in FIGS. 1 and 2) is utilized in a conventional acoustic guitar (with a fingerboard and strings attached to the hollow body in conventional fashion), then when one or more strings are played and vibrate and produce sound having a loudness in the range of thirty decibels to forty decibels, the hollow body resonates and amplifies the sound produced by the strings from two to sixty-four times. If the sound produced by the vibrating string(s) has a loudness of thirty decibels, the hollow body typically amplifies the sound from the strings such that the sound emanating from the hollow body has a loudness in the range of forty to fifty decibels (i.e., amplifies the sound from two to four times). If the sound produced by the vibrating string(s) has a loudness of forty decibels, the hollow body typically amplifies the sound from the strings such that the sound emanating from the hollow body has a loudness in the range of fifty to ninety decibels (i.e., amplifies the sound from two to thirty-two times). Consequently, it is preferred that the hollow body amplifies a thirty decibel sound produced by a vibrating string from two to sixteen times; and, amplifies a forty decibel sound produced by a vibrating string from two to sixty-four times. When the hollow body is utilized in the guitar of the invention, the hollow body functions to amplify sound emanating from speakers 41 to 43 and having a frequency in the range of 20 Hz to 20,000 Hz, 40 Hz to 1318 Hz, 40 Hz to 320 Hz, and/or any other desired frequency range. The hollow body can be fabricated from any desired material, but preferably is made from wood or plastic or various composites. Speakers 41 to 43 receive sound from an amplifier (not visible) mounted in the strummer assembly 40. Speakers 41 to 43 typically produce sound having a loudness in the range of thirty to ninety decibels, although the loudness of sound produced by speakers 41 to 43 can vary as desired.

Port 47 plays an important role in the sound resonating—amplification function of the guitar of the invention. Port 47 facilitates the resonation—amplification function of the guitar of the invention by directing sound to bout 60 so that the sound either can travel along bouts 60 and 61 by traveling through the bouts in the same manner that sound travels through water or can travel along and over the surface of bouts 60 and 61. If desired, more than one port 47 can be utilized to direct sound from one or more speakers 41 to 43 outwardly to bouts 60 and/or 61. Port 47 can also direct sound from one or more speakers 41 to 43 to face plate 10 or back plate 63 or bouts 60 and 61.

It is presently preferred that a guitar constructed in accordance with the invention include a plurality of strings 14. If desired, however, the strings 14 can be replaced by or used in conjunction with other components which can be manipulated by a user's fingers. Such components can be levers, buttons, a touch sensitive pad in which certain areas of the pad produce certain notes, etc.

The relative noise loudness produced by the guitar of the invention to the person playing the guitar is preferably in the range of five to ninety decibels. The sound pressure produced at the ears of the person playing the guitar is preferably in the range of about 0.002 dynes per square centimeter to twenty dynes per square centimeter. The power produced at the ear of the person playing the guitar is preferably in the range of $10^{-13}$ watts per square centimeter to $10^{-6}$ watts per square centimeter.

The shortest distance D (FIG. 1) across the face plate 10 of a full size guitar is about seven and one-half inches. The circular sound hole 12 presently has a diameter of about three and three-quarters inches. The ratio of the diameter of sound hole 12 to the shortest distance D across the face plate is preferably in the range of 1.5:1 to 3.5:1. This ratio is important in determining the tonal quality, resonance, and amplification of sound emanating from the guitar.

If desired, the location, diameter, and shape of sound hole 12 in plate 10 can vary as desired. More than one sound hole can be utilized. One or more sound holes may be formed in bouts 60, 61 and back plate 63. As noted, however, sound hole 12 is preferably located in the upper third (i.e., the upper portion) of face plate 10.

One or more speakers 41 to 43 are preferably (but not necessarily) positioned beneath plate 10 such that sound emanating from the speaker(s) travels outwardly through sound hole 12. In FIG. 1, speaker 43 is positioned beneath and is generally centered on sound hole 12 such that sound emanating outwardly from speaker 43 travels out through sound hole 12. Positioning a speaker 41 to 43 in registration with sound hole 12 is preferred because the sound emanating from the speaker is not altered by passing through face plate 10, but instead emanates outwardly from the guitar and mixes with sound produced by the natural vibrations of faceplate 10, back plate 63, and bouts 60 and 61. Consequently, the combination of a speaker in a hollow resonating body is important in the invention.

Strings 14 vibrate when played, but are insulated and muted so that only a minimal amount, if any, of sound is produced by the string vibrations per se. Any desired means may be used to mute the sound produced by the vibration of a string 14. Presently the entire strummer assembly 40 is insulated with grommets from the face plate 10, back plate 63, and bouts 60 and 61. Openings or materials can be incorporated in strummer assembly 40 to dampen the vibration of assembly 40.

The microprocessor utilized in the invention is used in conjunction with a memory which contains from seven chords to two thousand chords. The microprocessor is utilized in conjunction with a memory which stores for each note or chord a digital file representing the "wave file" of each note or chord. Conventional synthesizers typically utilize mathematical algorithms to create synthetically a tone or note. Other higher quality synthesizers utilize digital sampling to create the basis of the sound generated. The digital samples are modified with synthesized algorithms to create harmonics and longer lasting sounds. As earlier noted, digital sampling takes only a portion of the digital recording of a note, typically the initial "attack/decay" portion of the recording. Synthesized algorithms are used to take part of the "decay" portion and repeat it over and over and make the note "decay" artificially. The guitar of the invention also utilizes at least a portion of the complete digital recording of a note or chord, start to finish. The complete digital recording of a note lasts about eight to ten seconds. The guitar of the invention, however, preferably (but not necessarily) does not apply an artificial or mathematical algorithm to the digital sampling portion utilized. Instead, the sound of the note as recorded is utilized. The note is recorded by strumming an actual guitar string (or strings) and recording the sound produced. As a result, the electric guitar of the invention provides high quality realistic sound. The initial "attack/decay" portion used in digital samples lasts only about one-half to two seconds. The portion of the digital recording used in the invention is preferably (but not necessarily) at least the first three to four seconds, most preferably eight to ten seconds.

During use of the guitar of the invention, the microprocessor selects from memory the appropriate digital file of the note being "played" when a user strums a particular string. The file selected is utilized to generate a signal which causes sound to emanate from speakers 41 to 43. The electronics necessary to take the digital file of a note and generate sound at speakers 41 to 43 is well known in the art and is not detailed herein.

Sensor 22 can comprise any desired sensor including, by way of example and not limitation, optical sensors, stress sensors, strain sensors, electronic sensors, etc. Sensor 22 need not be activated by pad 21, but can detect movement of a string 14 by any other desired means. For example, a transducer detects movement of a string in an electromagnetic field adjacent the transducer.

It is presently preferred that the sensor 22 comprise rubber or some other compressible elastic electrically-insulative material impregnated with a plurality of electrically conductive fibers. The fibers are preferably in parallel, spaced apart relationship. Even when sensor 22 is not compressed by a pad 21, some of the electrically conductive carbon fibers in sensor 22 contact each other so that electricity continuously flows through sensor 20 and is detected by the microprocessor. When the sensor 22 is compressed, more of the fibers are pressed into contact each other, permitting a greater quantity of electricity to flow through the sensor from one side of the sensor to the other side of the sensor. The more the sensor is compressed, the greater the number of fibers that contact each other and the greater the amount of electricity that flows through the sensor per unit of time. Consequently, when a user uses more force to "play" or displace a string, pad 21 produces an increased compressive force on sensor 22, and a greater amount of electricity flows through sensor 22. The microprocessor detects the quantity of electricity flowing through sensor 22, and accordingly adjusts the volume and quality of sound produced by speakers 41 to 43.

When a conventional acoustic guitar is utilized, the vibration of the strings of the guitar is stopped by placing a hand over the strings. The microprocessor on the electronic guitar of the invention recognizes when a user places his hand over the strings and depresses the strings 14 because all or most of the strings are depressed at once and are not promptly released. When the microprocessor recognizes this pattern, it quickly mutes the guitar and prevents sound from emanating from speakers 41 to 43. When the guitar of the invention is being played in normal fashion, strings are displaced—either individually or together—and then are quickly released. The microprocessor recognizes this as a normal playing pattern and does not mute speakers 41 to 43.

When the guitar of the invention is played, sound initially emanates from speakers 41 to 43. Soon after sound emanates from speakers 41 to 43, the hollow body of the guitar resonates and amplifies a portion of the sound from speakers 41 to 43 such that sound simultaneously emanates both from speakers 41 to 43 and the hollow body. Since the sounds emanating from the speakers 41 to 43 and from the hollow body of the guitar are each produced by or derived from a resonating hollow body, the sound blends well and produces sound equivalent to that produce by a conventional acoustic guitar.

Having described my invention in such terms as to enable those of skill in the art to make and practice it, and having described the presently preferred embodiments thereof.

I claim:

1. An electric guitar including (a) a fingerboard;

(b) a plurality of strings;

(c) a hollow acoustic body including (i) a front, (ii) a back, (iii) elongate thin bouts extending intermediate the front and the back, the front back and bouts enclosing a hollow space, (iv) a hollow upper portion, and (v) a lower hollow portion connected to and larger than the upper portion, (vi) a sound hole formed through the front to allow resonant sound produced by resonance in the hollow space and bouts to escape outwardly from the hollow space through the sound hole;

(d) a speaker system mounted in the hollow acoustic body and including at least one speaker positioned at least partially beneath the sound hole and at least one speaker positioned at least partially offset from the sound hole and beneath the front;

(e) a system operatively associated with the strings and the speaker to cause sound to (i) emanate from the speaker system when the strings are played, and (ii) resonate in the hollow space and bout and produce resonant sound that emanates from the hollow space outwardly through the sound hole.

2. An electric guitar including (a) a fingerboard;

(b) a plurality of strings;

(c) a hollow acoustic body including (i) a front, (ii) a back, (iii) elongate thin bouts extending intermediate the front and the back, the front back and bouts enclosing a hollow space, (iv) a hollow upper portion, and (v) a lower hollow portion connected to and larger than the upper portion, (vi) a sound hole formed through the front to allow resonant sound produced by resonance in the hollow space and bouts to escape outwardly from the hollow space through the sound hole;

(d) a speaker system mounted in the hollow acoustic body and including at least one speaker;

(e) at least one port inside the hollow acoustic body extending outwardly from the speaker toward at least one of the bouts to direct sound from the speaker through the port to the bout to cause the bout to vibrate; and, (f) a system operatively associated with the strings and the speaker to cause sound to (i) emanate from the speaker system when the strings are played, and (ii) resonate in the hollow space and bout and produce resonant sound that emanates from the hollow space outwardly through the sound hole.

* * * * *